United States Patent [19]

Matsuo et al.

[11] Patent Number: 4,817,694
[45] Date of Patent: Apr. 4, 1989

[54] CONVEYING APPARATUS AND FIXING APPARATUS

[75] Inventors: Yukito Matsuo, Yokohama; Tsuyoshi Ishida, Yokohama; Kunihiko Nakamura, Yokohama; Mitsuaki Masuko, Tokyo; Kouitirou Shin, Saitama; Isao Shirai, Kanagawa, all of Japan

[73] Assignees: Kabushiki Kaisha Toshiba, Kawasaki; Nippon Airshooter Co., Ltd., Tokyo, both of Japan

[21] Appl. No.: 938,644

[22] Filed: Dec. 5, 1986

[30] Foreign Application Priority Data

Dec. 7, 1985 [JP] Japan ................. 60-275480

[51] Int. Cl.4 .................................... B65G 43/08
[52] U.S. Cl. .................. 198/346.2; 198/619; 198/347; 414/417
[58] Field of Search .............. 198/346.1, 346.2, 597, 198/619, 805, 854, 858, 347; 104/88; 406/2, 83, 186; 414/266, 268, 285, 331, 414, 416, 417

[56] References Cited

U.S. PATENT DOCUMENTS

| 3,212,623 | 10/1965 | Griffith | 198/597 X |
|---|---|---|---|
| 3,394,636 | 7/1968 | Vadas et al. | 198/803.7 X |
| 3,426,887 | 2/1969 | Ward et al. | 198/805 X |
| 3,502,038 | 3/1970 | Wesener | |
| 3,695,462 | 10/1972 | Sullivan | 414/414 X |
| 3,788,447 | 1/1974 | Stephanoff | 198/854 |
| 3,823,811 | 7/1974 | Brackmuller | 198/597 X |
| 3,892,372 | 7/1975 | Hauber | 406/2 |
| 4,144,960 | 3/1979 | Scourtes | 198/346.2 |
| 4,273,234 | 6/1981 | Bourgeois | 198/347 |
| 4,615,273 | 10/1986 | Osthus et al. | 198/346.1 |
| 4,728,243 | 3/1988 | Kliewer | 414/417 |
| 4,736,687 | 4/1988 | Grube et al. | 198/346.1 |

FOREIGN PATENT DOCUMENTS

| 2102234 | 8/1971 | Fed. Rep. of Germany. | |
| 5530726 | 3/1980 | Japan. | |
| 6093007 | 5/1985 | Japan | 414/331 |
| 1047635 | 11/1966 | United Kingdom | 406/2 |

OTHER PUBLICATIONS

Heinz, "Transportsystem fur Forderanlagen im Krankenhaus", Transport und Lagertechnik, 3/1975, No. 3, pp. 18-19.

Primary Examiner—Robert J. Spar
Assistant Examiner—D. Glenn Dayoan
Attorney, Agent, or Firm—Cushman, Darby & Cushman

[57] ABSTRACT

A conveying apparatus conveys storage cases, each containing at least one item of article to be conveyed, along a conveying path and includes main conveying mechanisms and sub-conveying mechanisms. The respective main conveying mechanism has a pair of guide rails which define a main conveying path for storage cases. Stations are located on the main conveying path and carriers are guided along the guide rails on the main conveying path. The carrier includes a storage section for storing the storage cases. The carrier is moved by a linear motor along the main conveying path and stopped at at least one station so that the storage case is conveyed to a destination. The sub-conveying mechanism includes a pair of case guides on sub-conveying path which extends from the station. The storage case is conveyed by a conveying belt along the case guides on the sub-conveying path. A supply section and receipt section are provided on the sub-conveying path, the supply section supplying the storage case to the conveying belt and the receipt section receiving the storage case from the conveying belt. A transfer mechanism is provided at the station to transfer the storage case between the carrier on the main conveying mechanism and the conveying belt for the sub-conveying mechanism.

13 Claims, 8 Drawing Sheets

F I G. 11
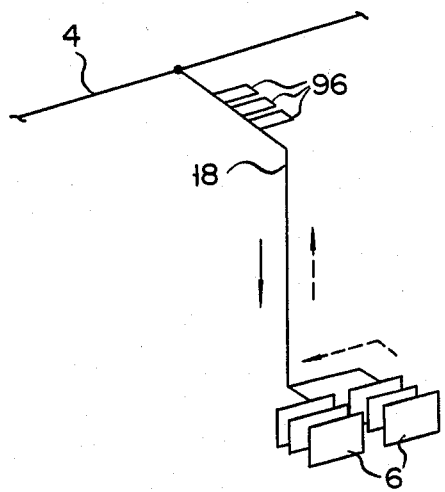
F I G. 12
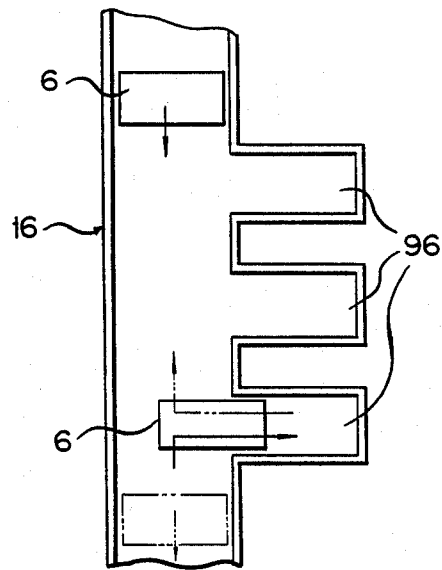

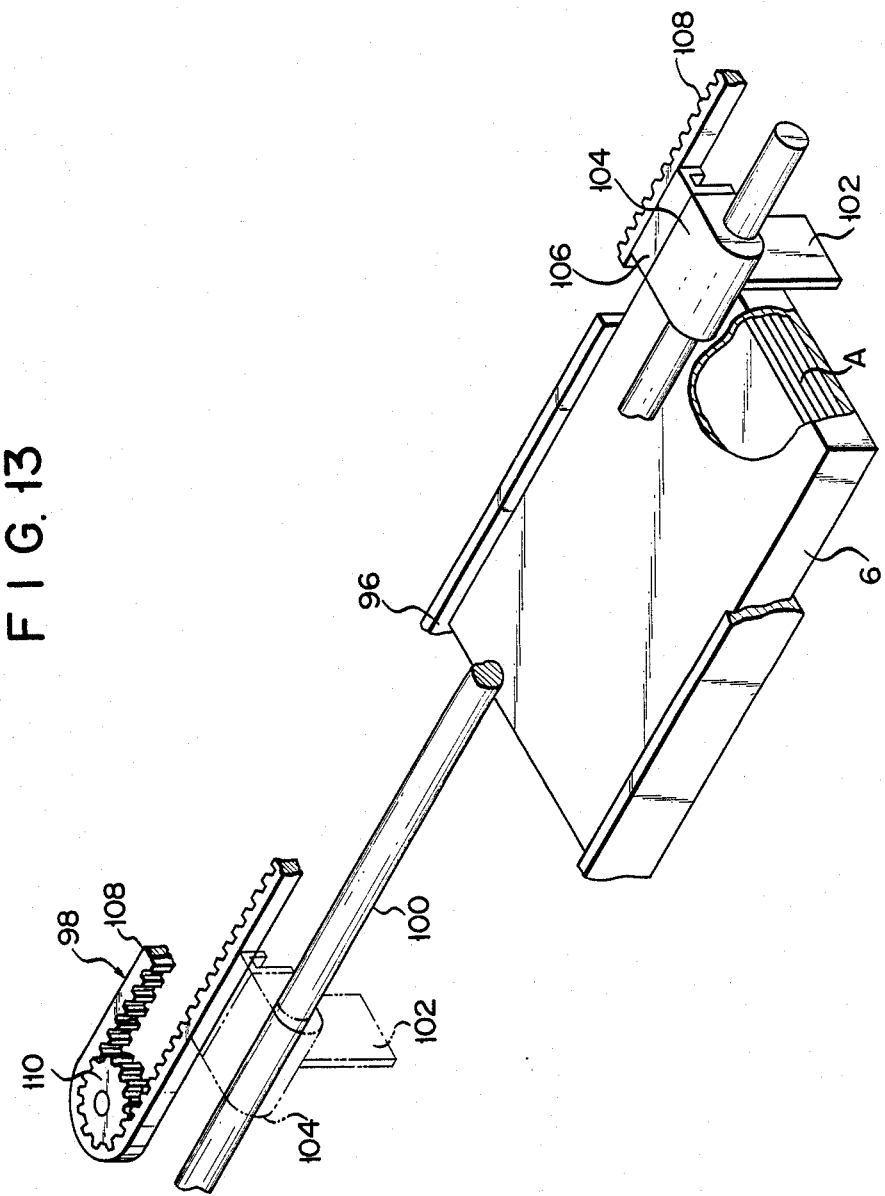

4,817,694

CONVEYING APPARATUS AND FIXING APPARATUS

BACKGROUND OF THE INVENTION

This invention relates to an apparatus for conveying clinical charts, slips, etc., as well as blood, Ringer's solution, etc., from location to location of hospitals and the like, and an apparatus for fixing these objects in place.

In the hospitals, for example, it is the common practice to deliver clinical charts, slips, etc., for a medical department to a consultation room. By way of example, the clinical charts, slips and heavy objects are conveyed by a storage case conveyor device, air shooter and vertical conveyor device. As another example, the charts, slips and the other objects are conveyed on the same type of conveying apparatus with a mobile vehicle. In the former case, various kinds of conveying devices are used, which occupies a large area and a high cost. In the latter case, only one kind of conveying device is required which is advantageous but is slow in conveying speed. The air shooter is capable of readily conveying such clinical charts, but it is difficult to feed heavy articles. This type of apparatus includes many mechanical contact areas on a conveying path and is noisy due to an air-borne sound from the conveying path.

SUMMARY OF THE INVENTION

It is accordingly the object of this invention to provide a conveying apparatus which can convey objects, such as clinical charts and slips quietly, with a simple type of apparatus, at high speed.

According to an aspect of the present invention, there is provided a conveying apparatus which comprises main conveying means including main conveying path defining means for defining a main conveying path, at least one station located along the main conveying path, at least one carrier movably guided along the main conveying path with said object contained therein, and driving and stopping means for moving the carrier along the main conveying path and stopping it at the station located along the main conveying path, so that said at least one object is delivered;

sub-conveying means including sub-conveying path defining means extending from the station and defining a sub-conveying path along which said object is conveyed, a conveying mechanism for conveying said object along said sub-conveying path, at least one of a supplying section for supplying said object to said conveying mechanism and a receipt section for receiving the object from said conveying mechanism; and transfer means for transferring the object, at the station, between the carrier of said main conveying means and said conveying mechanism of said sub-conveying means.

According to this invention the conveying apparatus is provided which comprises the main conveying path for conveying the object to at least one station on the main conveying path and the sub-conveying path extending from the station to convey the object therealong, in which at least one of an object supply section and object receipt section is provided on the sub-conveying path. This arrangement obviates the necessity of locating the main conveying path in the vicinity of the object supply section and object receipt section. As a result, the main conveying path can be formed as linearly as possible. As a result, the object is conveyed at high speed and low noise level and it can also be conveyed in a very stable state because of the object contained in a carrier.

BRIEF DESCRIPTION OF THE DRAWINGS

FIGS. 11 to 13 show another modification of the sub-conveying mechanism, FIG. 11 being a perspective view schematically showing the sub-conveying mechanism, FIG. 12 being a plan view schematically showing a temporary storage section and FIG. 13 being a perspective view showing a case access mechanism.

DETAILED DESCRIPTION OF THE PREFERRED EMBODIMENT

Figure 1:
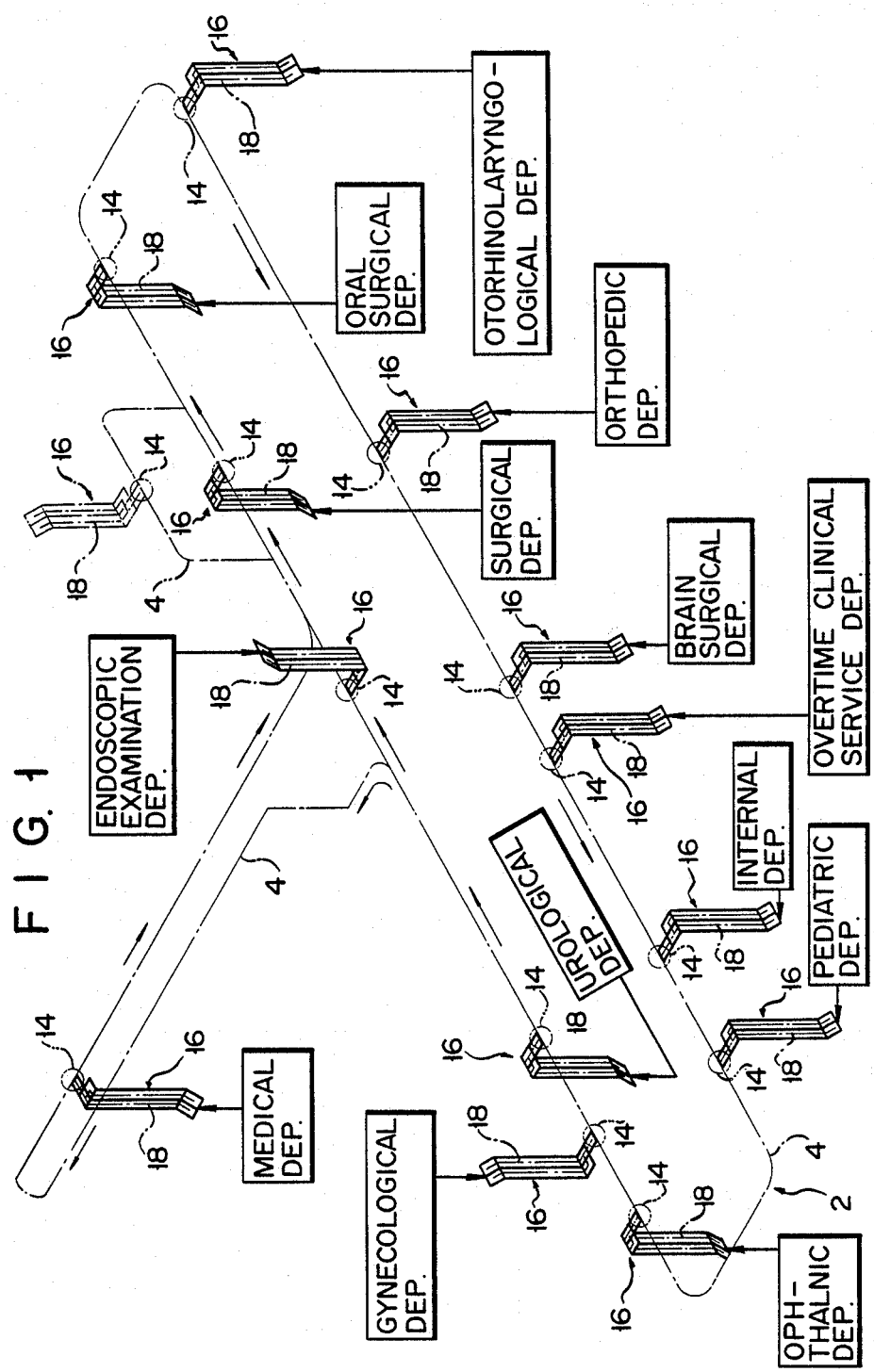
FIG. 1 is a perspective view showing one model of a conveying apparatus according to one embodiment of this invention.

In FIG. 1, main conveying mechanism 2 includes first main conveying path 4 formed in a loop fashion and second main conveying path 4 branched off of, and meeting, the first main conveying path 4.

Figure 2:
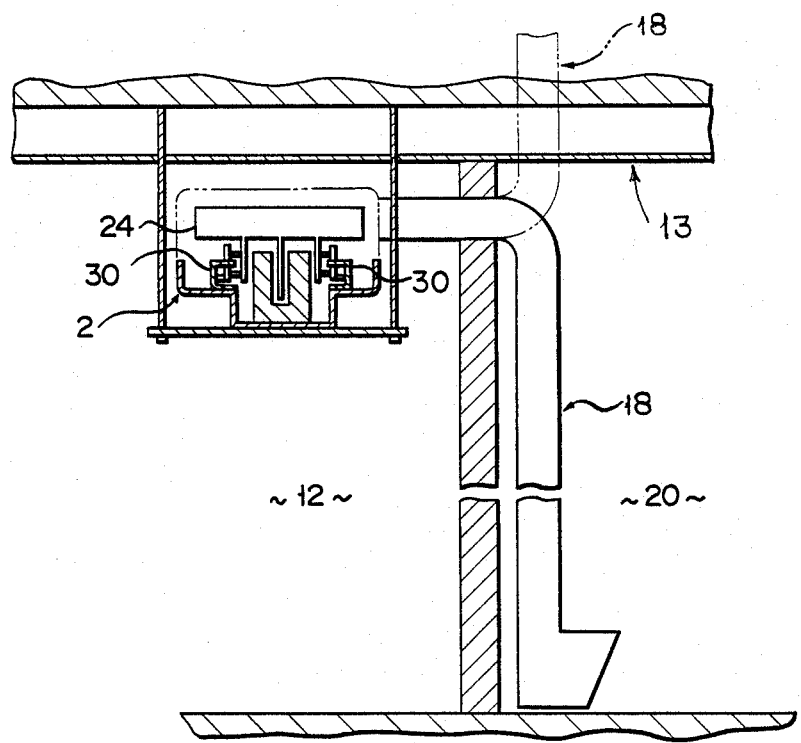
FIG. 2 is a view showing a positional relation of a main conveying mechanism to a sub-conveying mechanism of the conveying apparatus of FIG. 1.

As shown in FIG. 2 main conveying mechanism 2 is suspended from the ceiling 13 of corridor 12 of a building with main conveying path 4 located in a substantially horizontal fashion. A plurality of stations 14 are located on main conveying path 4 in a spaced-apart relation.

A plurality of sub-conveying mechanisms 16 are provided at the respective station to permit storage case 6 to be conveyed along a plurality of sub-conveying paths 18 extending from station 14 on the main conveying path 4. The aforementioned sub-conveying paths 18 on the respective station extend along the inner wall surface of respective room or chamber 20 of a medical, endoscopic examination, surgical, oral surgical, otorhinolaryngological, orthopedic, brain surgical, internal medicine, pediatric, ophthalmic, gynecological, urological, overtime clinical service or other departments.

Sub-conveying path 18 as indicated by a dash dot line in FIG. 2 extends up into consultation room 20 on an upper floor. Where, for example, sub-conveying path 18 is to be connected to consultation chamber 20 on the lower or the upper floor, third main conveying path 4 is provided which extends one floor up from the chamber, as indicated by a dash dot line in FIG. 1, into a chamber on the upper floor or one floor down from the chamber, not shown, into a chamber on the lower floor, in which case sub-conveying path 16 is connected to third main conveying path 4.

Figure 3:
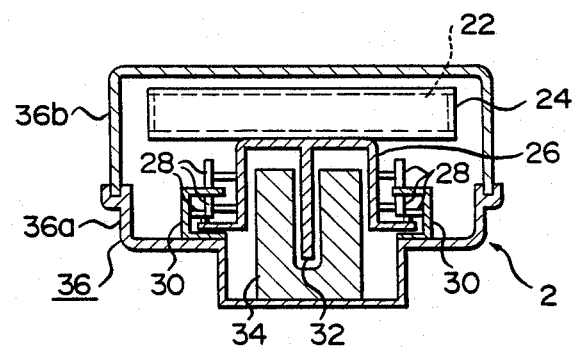
FIG. 3 is a cross-sectional view schematically showing the main conveying mechanism of the conveying apparatus.

As shown in more detail in FIG. 3, main conveying mechanism 2 includes carrier 24 having case holding section 22. Carrier 24 is supported on support member 26 which includes a plurality of guide rollers 28. Guide rollers 28 are guided on a pair of guide rails so that they are movable along the guide rails. Carrier 24 is movable at high speed along main conveying path 4.

Reaction plate 32 of a secondary conductor is provided in carrier 24 and stator 34 of a primary conductor is provided on main conveying path in a spaced-apart relation to reaction plate 32. The motor is comprised of reaction plate 32 and stator 34. Stator 34 is turned on by a power supply device not shown and a time-varying magnetic flux is applied to reaction plate 32. A predetermined propulsive or a braking force is developed in reaction plate 32 due to a change in the magnetic flux, so that carrier 24 is run or stopped.

Casing 36 is provided for covering main conveying mechanism 2 and comprised of lower case 36a and upper case 36b detachable from lower case 36a so as to permit ready access for checking, maintenance, etc.

Figure 4:
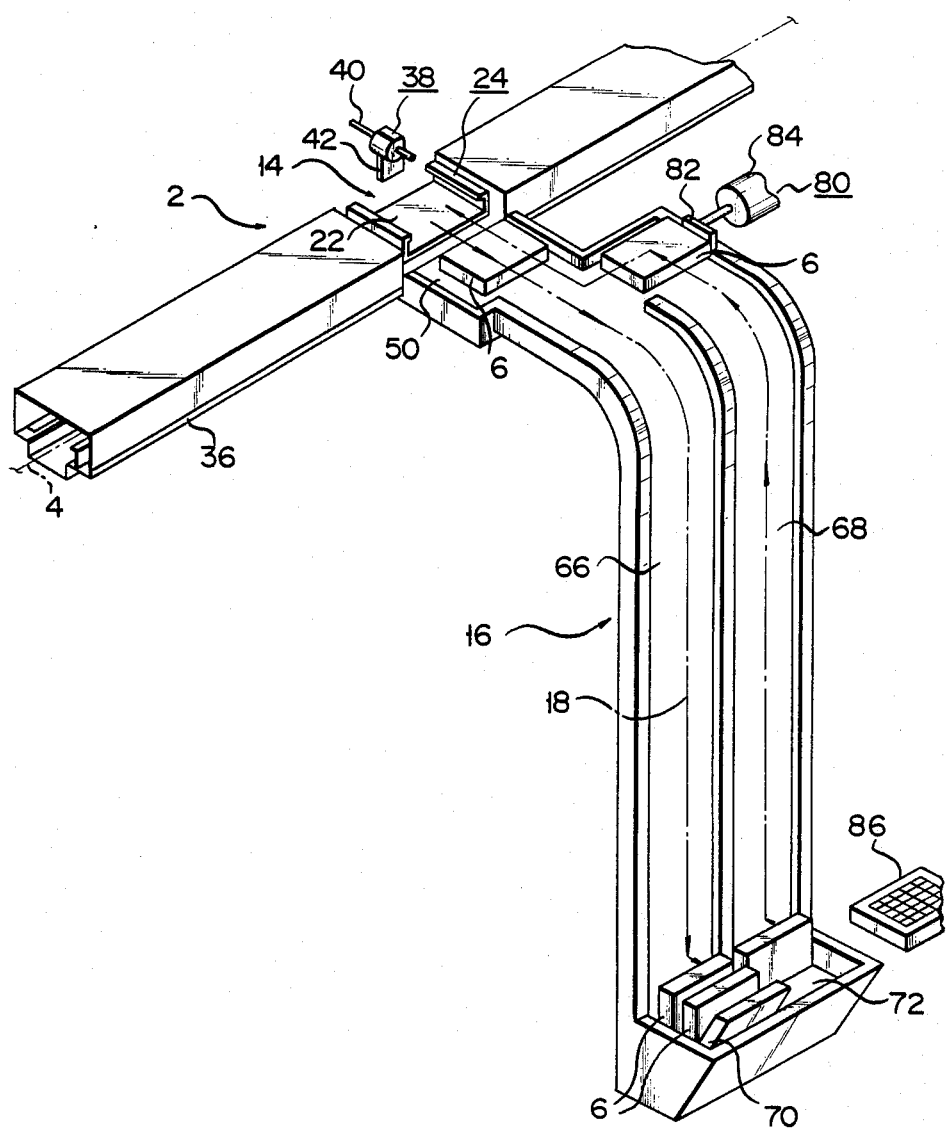
FIG. 4 is a perspective view schematically showing an object flow between the main and the sub-conveying mechanisms of the conveying apparatus.

A linear motor stator 34 is provided on station 14 on main conveying path 4. As shown in FIG. 4, carrier 24 is stopped, as required, at station 14. Case transfer mechanism 38 is provided relative to station 14.

Case transfer mechanism permits storage case 6 to be transferred between main conveying mechanism 2 and sub-conveying mechanism 16, thus assuring an automatic transfer of case 6 stored with the contents A, such as clinical charts or slips as well as blood of Ringer's solution, and a case whose contents A are emptied.

Figure 5:
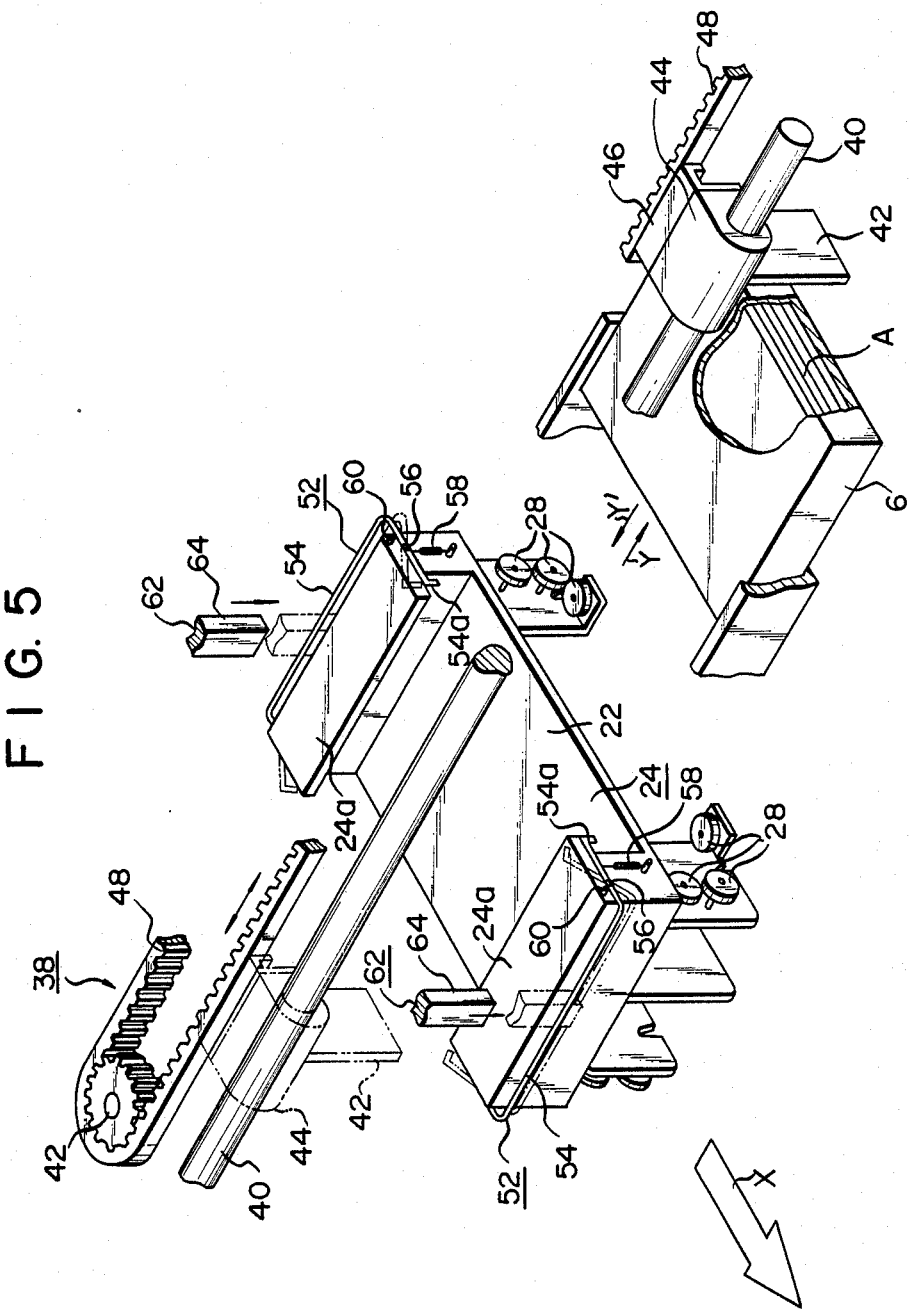
FIG. 5 is a front view diagrammatically showing a station in the conveying apparatus.

Case transfer mechanism 38 includes guide shaft 40, as shown in FIG. 5, which is located on main conveying path 4 in a direction (as indicated by Y in FIG. 5) orthogonal with that in which carrier 24 is moved. Movable member 44 with push-out plate 42 is slidably mounted on guide shaft 40. Timing belt 48 is connected through connector 46 to movable member 44. Timing belt 48 is adapted to be entrained between a pair of pulleys (only one is shown) 42 which are each located in the neighborhood of a corresponding end of guide shaft 40. One of pulleys 42 is driven by a pulse motor (not shown) through a reduction gearing, not shown. Movable member 44 with push-out plate 42 attached is reciprocably movable in the directions Y, Y' by driving the pulse motor.

Push-out plate 42 is located at a level at which the side face of case 6 is pushed out. By the reciprocatory movement of push-out plate 42 the case held within carrier 24 on main conveying mechanism 2 is pushed into receipt/delivery section 50 on the main conveying mechanism 2 or the case on receipt/delivery section 50 is delivered onto carrier 24.

As shown in FIG. 5, carrier 24 has substantially L-shaped holding members 24a which, together with case holding section 22, hold the storage case. Case 6 within case holding section 22 is freely movable in the aforementioned transfer direction, noting that restriction is made only to the movement of carrier 24 in the up and down directions and in the direction of main conveying path 4.

Case fixing mechanism 52 is provided at holding section 24a of carrier 24 so that case 6 held on case holding section 22 is not slipped off the case storage section 22 in transit.

Figure 6:
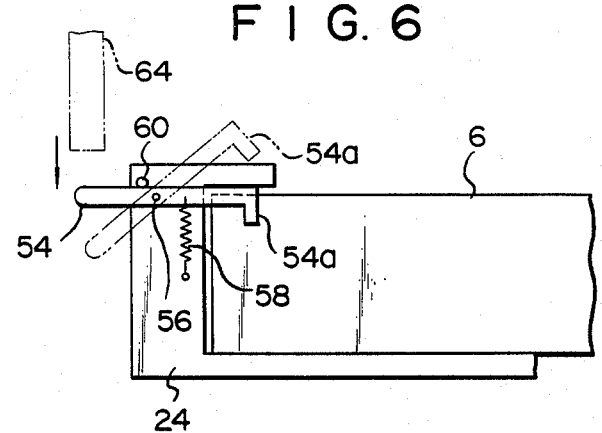
FIG. 6 is a front view schematically showing an object fixing mechanism in the conveying apparatus.

Case fixing mechanism 52 has a pair of fixing members 54 as shown in FIGS. 5 and 6. The fixing member is formed by bending a wire at each end in the same direction and further bending the forward ends downwardly. The fixing members are pivotally attached on a pair of support shafts 56.

Urging springs 58 are anchored to both the end portions of fixing members 54 and fixing member 54 is normally urged by springs 58 into fixing engagement with stoppers 60. That is, as indicated by a solid line in FIG. 6 forward ends 54a of fixing member 54 face toward a plane in which the case storage section extends. Case 6 on case holding section 22 is held by four forward end portions 54a.

Disengaging or releasing mechanism 62 is provided at the respective station to be brought out of engagement with case fixing mechanism 52, as required. Disengaging mechanism 62 includes a pair of push-down rods 64, 64 which are each lowered by a cylinder, not shown. As indicated by a dash dot line in FIG. 5, fixing member 54 is pushed down partway against the urging force of spring 58 and swung. Upon the swinging movement of fixing member 54, forward end portions 54a is displaced, as indicated by a dash dot line in FIG. 6, into a position where case 6 is inserted and delivered unhindered.

Figure 7:
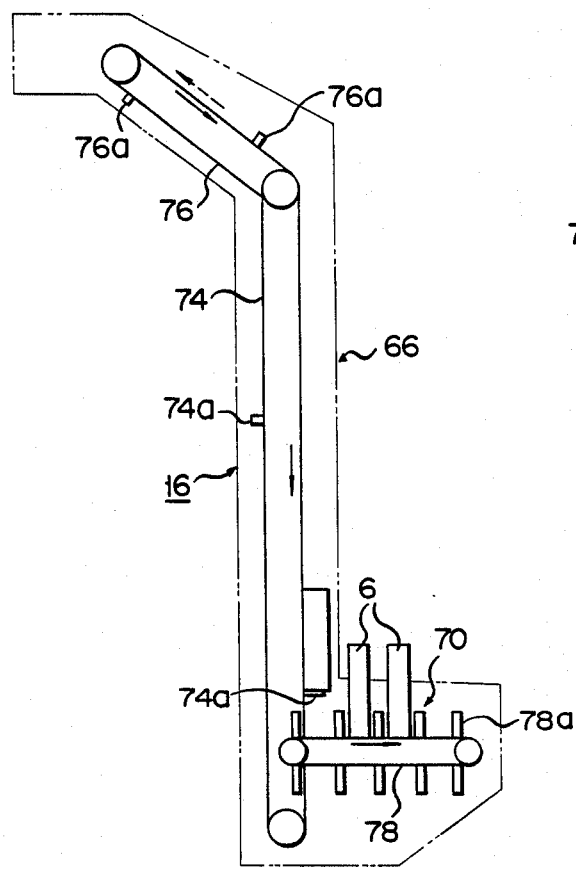
FIG. 7 is a side view schematically showing an internal arrangement of the sub-conveying mechanism on the conveying apparatus.

Sub-conveying mechanism 16 includes conveying section 66 for receipt and conveying section 68 for delivery as shown in FIG. 4. Conveying section 66 allows case 6 placed on receipt/delivery section 50 confronting the station 14 to be delivered onto case receipt section 70 which is provided in room 20. Conveying section 68 for delivery allows case 6 placed in case supply section 72 adjacent to case receipt section 70 to be delivered onto receipt/delivery section 50. Cases 6 are received in case receipt section and case supply section in an accumulated fashion. Conveying section 66 for receipt has first, projection-equipped conveying belt 74 which is provided in a vertically stretched state as shown in FIG. 7. Second, projection-equipped belt 76 is provided such that it is continuous relative to the upper end portion of first conveying belt 74. Lateral conveying belt 78 is provided orthogonal with the lower end portion of first belt 74.

Figure 8:
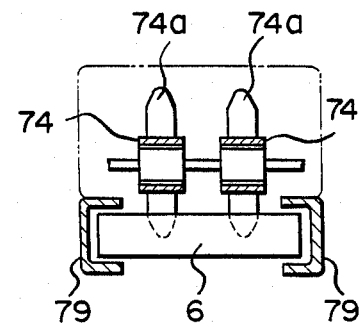
FIG. 8 is a plan view, partly in cross-section, showing the sub-conveying mechanism.

A pair of case guides 79 U-shaped in cross-section are provided along the run of first conveying belt 74 which is continuous relative to the lower tilted end of second conveying belt 76. As shown in FIG. 8 both the sides of case 6 are guided along case guides 79.

Case 6 on receipt/delivery section 50 is moved with its rear end side pushed by the projection 76a in the direction as indicated by a solid line in FIG. 7 to allow case 6 to be positively guided by the case guides. The lower end side of case 6 is supported by projection 74a of first conveying belt 74. During the run of first conveying belt 74, case 6 is fed down onto lateral conveying belt 78. Back-up members 78a are attached to lateral conveying belt 78 at a predetermined interval. Upon receipt of case 6, lateral conveying belt 78 is moved at one pitch into case receipt section 70 in an upright position.

Conveying section 68 for delivery is not equipped with second conveying belt 76 for conveying section 66. The back-up member-equipped lateral conveying belt is run in the direction opposite to that in which the projection-equipped conveying belt is run. Case 6 which is placed in case supply section 72 is moved toward the projection-equipped conveying belt side with the run of the lateral conveying belt so that it is pushed up by the projection.

Push-out mechanism 80 is located, as shown in FIG. 4, at that ending side of the projection-equipped conveying belt 68 where it is pushed onto second projection equipped conveying belt 76 for conveying section 66 and then sent onto receipt/delivery section 50 by the reverse movement of second conveying belt 76.

Push-out mechanism 80 includes push-out plate 82 which is reciprocably moved by cylinder 84.

Input device 86 for destination data inputting is disposed in the neighborhood of case supply section 72. The destination data of case 6 in case supply section 72 is input from input device 86 so that it may be transferred to predetermined room 20.

The operation of the conveying apparatus according to this invention will be explained below.

First suppose that objects, such as clinical charts and slips, are sent from the medical to the internal medicine department.

In the medical department, necessary charts, slips or the other objects are put as the contents A in case 6 and that case 6 is placed on case supply section 72. The destination, for example, the medical department of the case is input to input device 86.

Case 6 is fed up on conveying section 68 of sub-conveying path 18. Where detecting means, not shown, confirms that no case is placed on second conveying belt 76 and on receipt/delivery section 50, then case 6 so fed is pushed by push-out mechanism 80 onto second conveying belt 76.

Then case 6 with the contents A contained is sent onto receipt/delivery section 50.

When empty carrier 24 is stopped in front of station 14, case transfer mechanism 38 is operated, transferring the case into carrier 22. At this time case fixing mechanism 52 is initially placed in the "unfixed" state by the operation of disengaging mechanism 62.

With case 6 transferred into carrier 6, push-down rod 64 of disengaging mechanism 62 rises, causing fixing member 54 of case fixing mechanism 52 to be swung, under a recovery force of spring 58, into engagement with stopper 60 so that case 6 is fixed in place.

Stator 34 placed over main conveying path 4 is driven by a power supply device not shown and then a time-varying magnetic flux is applied to reaction plate 32 which is attached to carrier 24, causing a predetermined propulsive force to be induced in reaction plate 32 whereby carrier 24 is run.

Thereafter, carrier 24 is fed onto first main conveying path 14 and, based on destination data on case 6, is stopped in front of station 14 corresponding to the internal medicine department. The case fixing mechanism 52 is placed in the "unfixed" position by disengaging mechanism 62 and then case 6 is transferred by case transfer mechanism 38 onto receipt/delivery section 50. Then case 6 is sent onto case receipt section 50 through conveying section 66 of sub-conveying mechanism 16.

Where case receipt section 50 is "occupied", case 6 on main conveying path 4 is not sent onto sub-conveying path (18) side by information from the detector not shown and consequently carrier 24 is circulated in which case the run of successor carrier 24 is never prevented. At this time an alarm sound representing an occupied state in case receipt section 70 is produced by means of an alarm, not shown.

Although the transfer of case 6 has been explained as being made from the medical to the internal medicine department, the reverse transfer as well as the transfer to another department may also be achieved.

Sub-conveying path 18 extending into a room on the upper floor is of such a type that the conveying system is reversed with a substantially same operation.

According to the aforementioned embodiment, sub-conveying paths 18 extend from station 14 on main conveying path 4. The case placed onto case supply section 72 is loaded into carrier 24 through sub-conveying path 18 or the case which is unloaded from carrier 24 is conveyed to case receipt section 70 through sub-conveying path 18. It is, therefore, not necessary to provide main conveying path 4 itself in the vicinity of case supply section 72 and case receipt section 70. It is possible to provide main conveying path 4 as linearly as possible and thus to automatically convey the cases very readily at high speed and low noise level. Case receipt section 22 is provided at carrier 24 and case 6 is fed such that it is enclosed within case storage section. As a result, a plurality of objects are conveyed as one unit (i.e. in a case) at a very stable state in large quantity.

Since sub-conveying path 18 extends in the up or the down direction of main conveying path 4, it can be laid along the ceiling surface of the underlying floor, thus providing a larger space saving.

The objects to be conveyed are explained above as being contained in storage case 6 unique to such a conveying system. Due to the presence of a plurality of carriers 24 and of storage cases 6 the conveying apparatus can be readily automated in the positive and effective way.

Carriers 24 on main conveying mechanism 2 can be conveyed by the linear motor at high speed. Furthermore, carriers 24 can readily be controlled under the operation of the reduction gearing and there is less trouble due to the use of a non-contacting conveying method. The main conveying mechanism can readily be laid along the ceiling surface, etc. Moreover, less maintenance can be achieved in comparison with that involved in a conventional case conveyor, air shooter, self-running vehicle.

Release mechanism 62 is located at station 14, not at carrier 24, to release a fixing engagement, as required, which is achieved by case fixing mechanism 52. Therefore, carrier 24 can be formed as a simple and compact structure.

Figure 9:
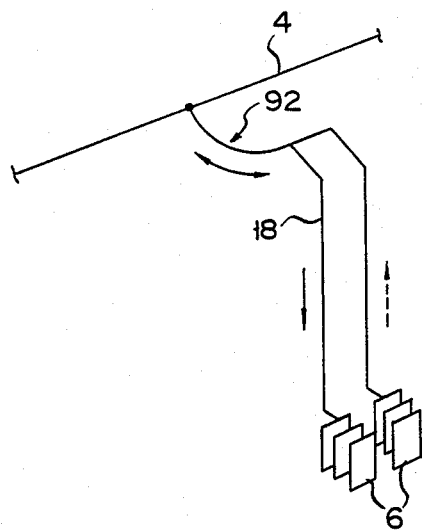
FIGS. 9 and 10 show a modified form of the sub-conveying mechanism, FIG. 9 being a perspective view schematically showing the sub-mechanism and FIG. 10 being a plan view showing a direction change section of the sub-mechanism.
Figure 10:
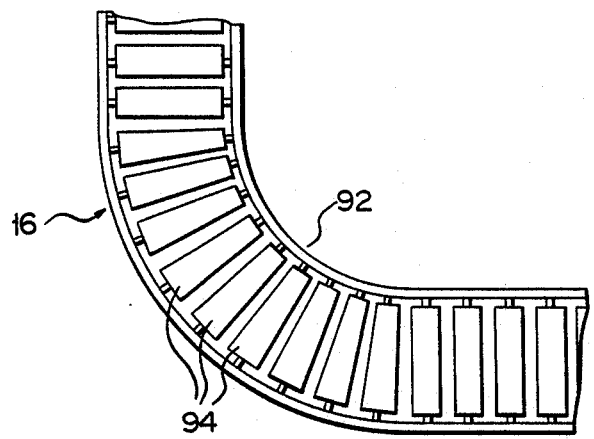

FIGS. 9 and 10 show a modified form of sub-conveying mechanism 16 which includes direction changing section 92 on sub-conveying path 18. In this direction changing section 92, sub-conveying path 18 is curved in a quarter circle along which a plurality of frusto-conical conveying rollers 94 are arranged. Storage case 6 is turned through 90° upon the passage of case 6 along the direction changing section 92. Where case 6 is conveyed along main conveying path 4 with its longitudinal sides oriented therealong, it is conveyed between direction changing section 92 on one hand and case receipt section 70 and case supply section on the other hand with its longitudinal sides oriented therealong, thus providing a narrow sub-conveying path 18.

FIGS. 11 to 13 show another form of sub-conveying mechanism 16 where, in addition to said case receipt section 70 and case supply section 72, a plurality of temporary storage sections are provided for temporarily storing the case or cases on sub-conveying path 18. Case access mechanism 98 is provided above respective temporary storage section 96. Case access mechanism 98 includes guide shaft 100 which is located orthogonal with sub-conveying path 18. Movable member 104 equipped with push-out plate 102 is slidably mounted on shaft 100. Timing belt 108 is connected to movable member 104 through coupling member 106 such that it is entrained around a pair of pulleys 110 (only one is shown) which are located one near each end of guide shaft 100. One of pulleys 110 is driven by a pulse motor, not shown, through the reduction gearing, not shown, causing movable member 104 equipped with pushout plate 102 to be recipro-cally moved along shaft 100 as the pulse motor is driven.

Push-out plate 102 is located at a level at which the sides of storage case are pushed. Upon the reciprocatory movement of push-out plate 6, case 6 on sub-conveying path 18 is pushed temporarily into case storage section 96 or case 6 in temporary storage section 96 is pushed onto sub-conveying path 18.

Even with the case occupied in case receipt section 70, the case is transferred from carrier 24 on main conveying mechanism 2 into case storage section 96 on sub-conveying mechanism 16, thus assuring an improved conveying efficiency on the main conveying mechanism 2. In this modification, conveying section 66 for receipt and conveying section 68 for delivery are used as a combined section.

What is claimed is:

1. A conveying apparatus for conveying at least one object, comprising;
   main conveying means including main conveying path defining means for defining a main conveying path, at least one station located along the main conveying path, at least one carrier movably guided along the main conveying path with said object contained therein, and driving/stopping means for moving the carrier along the main conveying path and stopping it at the station located along the main conveying path, so that said at least one object is delivered, said driving/stopping means including a plurality of first conductors arranged along said main conveying path at predetermined intervals, and a second conductor attached to the carrier and driven by the first conductors;
   sub-conveying means including sub-conveying path defining means extending from the station and defining a sub-conveying path along which said object is conveyed, a conveying mechanism for conveying said object along said sub-conveying path, a first supply/receipt section located at an end of said sub-conveying means adjacent to said main conveying path, a second supply/receipt section located at another end of said sub-conveying path, spaced from said main conveying path, said second supply/receipt station supplying said object to said conveying mechanism and receiving the object from said conveying mechanism, said conveying mechanism including a first conveying section for conveying the object from the first supply/receipt section to the second supply/receipt section, and a second conveying section for conveying the object from the second supply/receipt section to the first supply/receipt section;
   transfer means for transferring objects in the station such that objects on the main conveying means are transferred to the sub-conveying means and objects on the sub-conveying means are transferred to the main conveying means; and
   a fixing apparatus which includes:
   fixing means attached to said carrier, said fixing means being movable between a first position, where the object is fixed to said carrier, and a second position, where the object is not fixed to said carrier;
   urging means for urging the fixing means towards the first position; and
   releasing means mounted on said conveying path, along which said carrier is conveyed, said releasing means moving the fixing means towards the second position against the urging force of said urging means, thereby releasing the object from said fixing means.

2. The conveying apparatus according to claim 1, wherein said sub-conveying path extends in a different direction from that in which said carrier is conveyed on said main conveying means.

3. The conveying apparatus according to claim 2, wherein said main conveying path extends in a substantially horizontal direction.

4. The conveying apparatus according to claim 3, wherein said sub-conveying path extends above said main conveying path.

5. The conveying apparatus according to claim 3, wherein said sub-conveying path extends below said main conveying path.

6. The conveying apparatus according to claim 1, wherein said main conveying means has support means for supporting said main conveying path defining means.

7. The conveying apparatus according to claim 6, wherein said support means includes a building with a ceiling surface, said main conveying path defining means supported by the ceiling surface.

8. The conveying apparatus according to claim 7, wherein said main conveying path is located along said ceiling surface of the building.

9. The conveying apparatus according to claim 8, wherein said building is of a multi-story type.

10. The conveying apparatus according to claim 9, wherein said building includes a room and floor, the room defined by the floor and ceiling surface, said sub-conveying path extending up into the room on the upper floor.

11. The conveying apparatus according to claim 9, wherein said building includes a room and floor, the room defined by the floor and ceiling surface, said sub-conveying path extending on the floor.

12. The conveying apparatus according to claim 1, wherein said object serves as a storage case containing at least one item of article.

13. The conveying apparatus according to claim 1, wherein said sub-conveying means includes a direction change section for varying the direction along which said object is conveyed.

* * * * *